United States Patent
Liu

(10) Patent No.: US 7,567,319 B2
(45) Date of Patent: Jul. 28, 2009

(54) LCOS DISPLAY WITH A COLOR PIXEL ARRAY WITH MULTIPLE REFLECTIVE LAYERS AND FABRICATION METHOD THEREOF

(75) Inventor: Yan-Hsiu Liu, Tai-Nan (TW)

(73) Assignee: United Microelectronics Corp., Hsin-Chu (TW)

( * ) Notice: Subject to any disclaimer, the term of this patent is extended or adjusted under 35 U.S.C. 154(b) by 137 days.

(21) Appl. No.: 11/751,040

(22) Filed: May 21, 2007

(65) Prior Publication Data

US 2008/0291373 A1 Nov. 27, 2008

(51) Int. Cl.
*G02F 1/1335* (2006.01)
(52) U.S. Cl. .............................. 349/113; 349/5; 349/106
(58) Field of Classification Search ................ 349/5–10, 349/148, 106–109, 113, 187
See application file for complete search history.

(56) References Cited

U.S. PATENT DOCUMENTS

| 4,534,620 | A | 8/1985 | Gale et al. |
| 7,121,669 | B2 | 10/2006 | Iisaka |
| 7,128,426 | B2 | 10/2006 | Watanabe |
| 2004/0095527 | A1* | 5/2004 | Liao ........................... 349/106 |

* cited by examiner

*Primary Examiner*—Andrew Schechter
*Assistant Examiner*—Michael Inadomi
(74) *Attorney, Agent, or Firm*—Winston Hsu

(57) ABSTRACT

A method of fabricating an LCoS display with a color pixel array comprises a step of disposing reflective layers between various color filter layers. The reflective layers are used as etching stop layers between color filter layers so that etching processes are capable of defining patterns of the color filter layers in different sub-pixels for forming the color pixel array.

21 Claims, 22 Drawing Sheets

LCOS DISPLAY WITH A COLOR PIXEL ARRAY WITH MULTIPLE REFLECTIVE LAYERS AND FABRICATION METHOD THEREOF

BACKGROUND OF THE INVENTION

1. Field of the Invention

The present invention relates to a colorful liquid crystal on silicon (LCoS) display, and more particularly, to a reflective color LCoS display.

2. Description of the Prior Art

LCoS display technology is the key of reflective LCoS projectors and rear-projection televisions. The advantages of LCoS micro-displays are a tiny size, high resolution, low power, low cost, etc. The difference between an LCoS display and a conventional thin film transistor-liquid crystal display (TFT-LCD) is materials used for forming the substrates. Both a cover substrate and a backplane are made of glass in a TFT-LCD. Nevertheless, the cover substrate in an LCoS display is made of glass, but the backplane in an LCoS display is a semiconductor substrate, such as silicon. Therefore, an LCoS process combines LCD techniques and complementary metal-oxide semiconductor (CMOS) fabrication processes.

The main structure of an LCoS display includes a light source module, an LCoS panel, and a color separation and combination optical system. Generally speaking, the LCoS display can be divided into three-panel LCoS displays and single-panel LCoS displays according to the type of optical engine. The three-panel type optical engine separates lights generated from light source into red, blue, and green lights through a plurality of prisms, projects those lights into three separated LCoS panels respectively, and combines those three lights from each LCoS panel to form colored images. The single-panel type optical engine utilizes a color wheel to form red, blue, and green lights sequentially from white lights, and synchronizes the three kinds of lights with single-colored images, the red, blue, and green images, formed by driving programs so as to produce color-separated images sequentially. Since human eyes have the persistence of vision, people can see colored images from the projected images.

As a result, in the conventional LCoS displays, it is rare that a LCoS panel has a color pixel array with different types color filter layers because the fabrication technology of the micro color filters formed with inorganic dichroic materials is difficult and has high cost. Therefore, a single conventional LCoS panel cannot separate natural light or a white light source into primary color lights, the green light, red light, and blue light, or other color lights to produce images. Therefore, the above-mentioned color wheel or color separation and combination optical system have to be used with several LCoS panels for generating colorful images, thus a conventional LCoS display with pluralities of LCoS panels and a complex optical engine has high fabrication cost and does not meet the market requirement of small-size products.

The U.S. Pat. No. 4,534,620 provided by Gale et al. mentions that yellow, green, or cyan dichroic films might be stacked to form a color-encoding transmissive filter, wherein complicated processes, such as the adoption of both the dry and wet etching processes, have to be in cooperation with some specific materials, such as a surface material inert to wet etchants, for forming the predetermined profiles of the yellow, green, or cyan stacked structures because their etching selection ratios are very low. In addition, Jisaka further provides an U.S. Pat. No. 7,121,669 to disclose a fabrication method of a color pixel array of a transparent TFT-LCD. He teaches depositing a first layer of color filter on a transparent glass or quartz substrate, etching the color filter to define a predetermined pattern, forming a thick transmissive interlayer on the color filter, depositing a second layer of color filter on the transmissive interlayer, etching the second color filter, and forming another thick transmissive interlayer thereon. The above-mentioned processes may be repeated several times to form a color filter structure with a thickness comprising at least three color filters and three thick transmissive interlayers on the transparent substrate. Accordingly, the fabrication method of color pixel array disclosed by Jisaka is complicated and expensive, and his color filter structure is too thick to meet the small-size requirement of display market.

As a result, how to fabricate micro color filters with different colors or a color pixel array on a semiconductor substrate of a single LCoS panel through simple processes is still an important issue for LCoS display manufacturers.

SUMMARY OF THE INVENTION

It is therefore a primary objective of the claimed invention to provide an LCoS display with a color pixel array and fabrication method thereof to solve the above-mentioned problem.

According to the claimed invention, the fabrication method of an LCoS display with a color pixel array comprises providing a semiconductor substrate; successively forming a first reflective layer, a first color filter layer, a second reflective layer, and a second color filter layer on the semiconductor substrate; forming a first patterned layer with a first exposed region on the second color filter layer; removing portions of the second color filter layer and second reflective layer exposed by the first patterned layer so as to form a first opening; removing the first patterned layer; and forming a first planarized layer in the first opening to planarize the surface of the semiconductor substrate.

According to the claimed invention, a fabrication method of an LCoS display is further provided. The fabrication method comprises providing a semiconductor substrate; successively forming a first reflective layer, a first color filter layer, a second reflective layer, a second color filter layer, a third reflective layer, and a third color filter layer on the semiconductor substrate; forming a first patterned layer with a first exposed region on the third color filter layer; performing a first etching process to removing portions of the third color filter layer and the third reflective layer exposed by the first patterned layer to form a first opening in the third color filter layer; forming a second patterned layer with a second exposed region on the third color filter layer; performing a second etching process to remove portions of the third color filter layer and the third reflective layer exposed by the second patterned layer to form a second opening; and forming a first planarized layer in the first or the second opening on the semiconductor substrate.

According to the claimed invention, an LCoS display is provided. The LCoS display comprises a semiconductor substrate with a plurality of sub-pixels defined thereon, a first reflective layer, a first color filter layer, a second reflective layer, a second color filter layer disposed, a third reflective layer, and a third color filter layer disposed on the semiconductor substrate in order. The second color filter layer and the second reflective comprise a first opening corresponding to a first sub-pixel on the semiconductor substrate; and the third reflective layer and the third color filter layer comprise a second opening corresponding to the first sub-pixel and a second sub-pixel on the semiconductor substrate.

It is an advantage that the present invention provides a method to dispose reflective layers between different color filter layers and take the reflective layers as etching stop layers between color filter layers, such that simple etching processes can be used to define various patterns of color filter layers in various sub-pixels. Accordingly, the present invention can provide an LCoS panel with a color pixel array with simple fabrication process.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
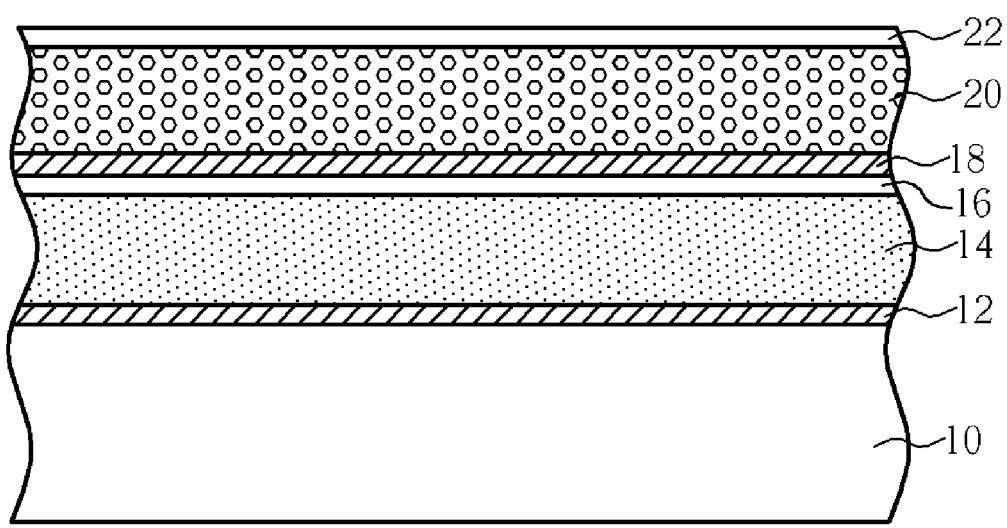
FIGS. 1-7 are schematic diagrams of the fabrication method of an LCoS display with a color pixel array according to a first embodiment of the present invention.

Please refer to FIGS. 1-7. FIGS. 1-7 are schematic diagrams of the fabrication method of an LCoS display with a color pixel array according to a first embodiment of the present invention. In this embodiment, the present invention LCoS display is a reflective color LCoS display. As shown in FIG. 1, a semiconductor substrate 10, such as a silicon substrate, is provided, with a plurality of sub-pixel circuits and electric devices (not shown). Then, a first reflective layer 12, a first dichroic film 14, a first buffer layer 16, a second reflective layer 18, and a second dichroic film 20 are successively formed on the surface of the semiconductor substrate 10. The first and the second reflective layers 12, 18 may comprise conductive metal materials such that the first reflective layer 12 is capable of serving as a pixel electrode. The first dichroic film 14 and the second dichroic film 20 respectively serve as a first and a second color filter layers that may comprise high reflective films or dichroic materials. In addition, the first and second dichroic films 14, 20 preferably comprise inorganic dichroic films that may, such as titanium dioxide and silicon dioxide films, stacking with different thickness. Furthermore, a second buffer layer 22 may be selectively formed on the surface of the second dichroic film 20. The first and second buffer layers 16, 22 are disposed between the first dichroic film 14 and the second reflective layer 18 and between the second dichroic film 20 and a post-formed third reflective layer (not shown) respectively, and they provide a buffer functionality in the following etching processes and may comprise materials the same as materials of the first and second dichroic films 14, 20. For example, the material of the first buffer layer 16 may be the same as the surface material of the first dichroic film 14. Therefore, when forming the first dichroic film 14 and the first buffer layer 16, the materials of the first dichroic film 14 may be deposited on the semiconductor substrate 10 with a thickness a little thicker than a predetermined thickness of the first dichroic film 14, while the extra portion may serve as the first buffer layer 16. However, the first and second buffer layers 16, 22 may comprise materials different from those of the first and second dichroic films 14, 20, such as epoxy, provided that the materials of the first and second buffer layers 16, 22 do not influence the optical effect and have high etching selecting ratio to the reflective layers. Furthermore, in various embodiments, the first and second buffer layers 16, 22 may be omitted and the second reflective layer 18 is formed directly on and in contact with the first dichroic film 14.

Figure 2:
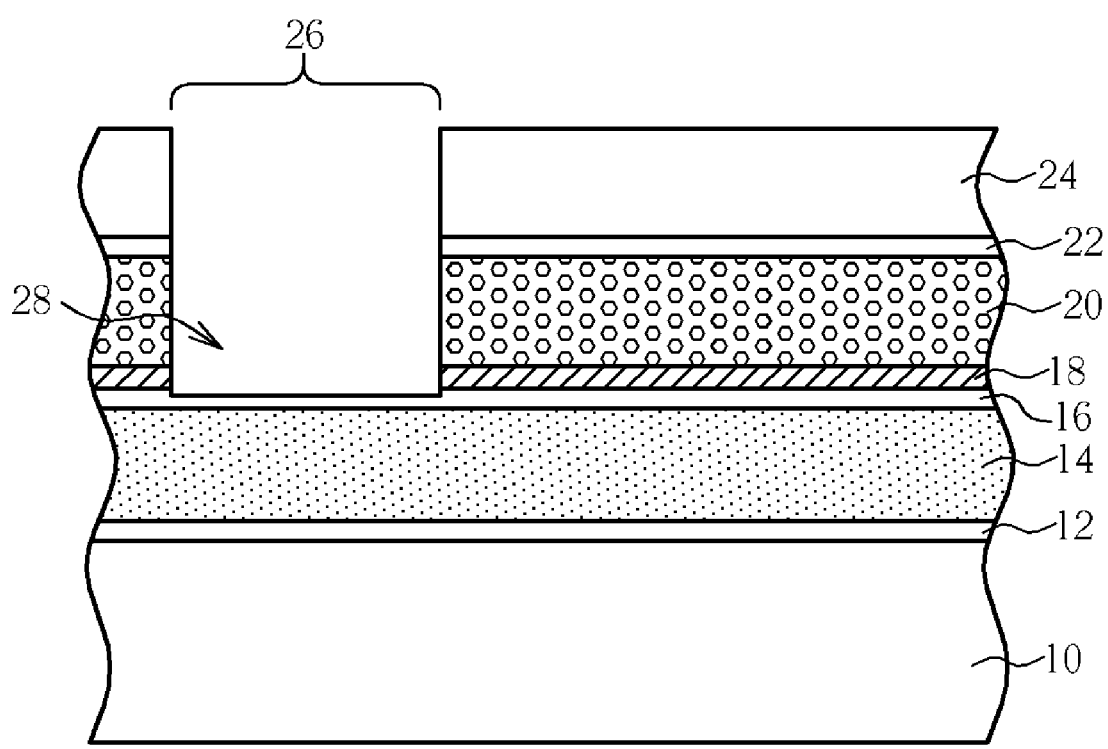

As shown in FIG. 2, a first patterned layer 24 is formed on the semiconductor substrate 10, comprising organic materials or photoresist materials and being defined with a first exposed region 26 through a lithography process. The first exposed region 26 corresponds to at least a first sub-pixel 46 (shown in FIG. 6). Then, the first patterned layer 24 is used as an etching mask for removing portions of the second buffer layer 22, the second dichroic film 20, and the second reflective layer 18 exposed by the first exposed region 26 of the first patterned layer 24. In this embodiment, the second buffer layer 22 and the second dichroic film 20 comprise the same materials, so that portions of the second buffer layer 22 and the second dichroic film 20 may be removed through a single etching process to expose a portion of the second reflective layer 18. Thereafter, a different etchant is used to remove the second reflective layer 18 exposed by the second dichroic film 20 until the first buffer layer 16 or the first dichroic film 14 is exposed, forming a first opening 28 in the second dichroic film 20 and the second reflective layer 18. In this embodiment, it is possible that the step of removing a portion of the second reflective layer 18 also removes a few amount of the first buffer layer 16, while the etching step stops on the first buffer layer 16 without damaging the thickness of the first dichroic film 14. However, since the second reflective layer 18 comprises metal materials, it should have a high etching selecting ratio to the first dichroic film 14 or the first buffer layer 16. Therefore, if the etching process of the second reflective layer 18 could be controlled well to not remove dichroic materials below the second reflective layer 18, the first buffer layer 16 is not needed for protecting the first dichroic film 14.

Figure 3:
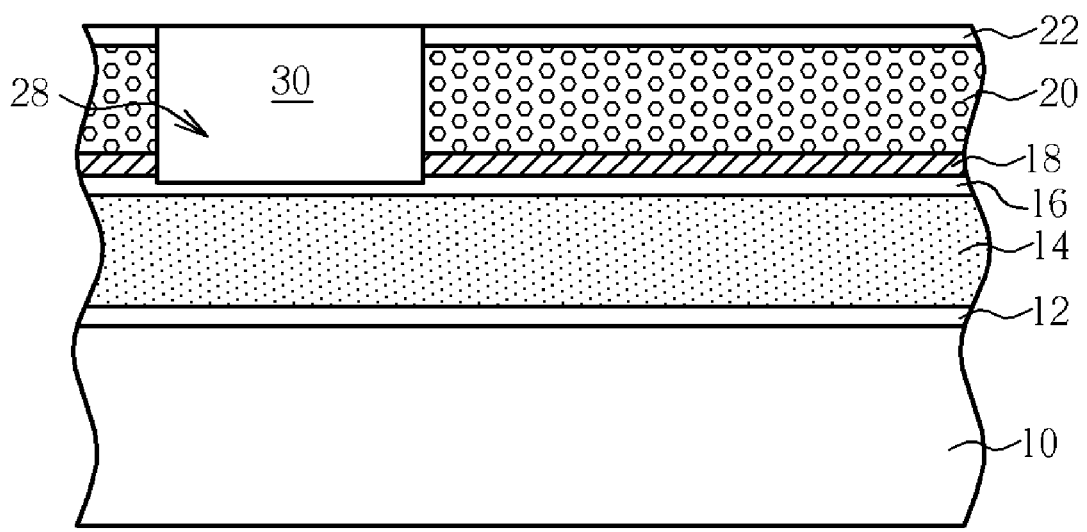

Referring to FIG. 3, the first patterned layer 24 is removed, and a first planarized layer 30 is filled into the first opening 28, on the surface of the first dichroic film 14 or the first buffer layer 16, wherein the first planarized layer 30 may comprise materials the same as the materials of the first dichroic film 14 or the first buffer layer 16, and can be formed by a blanket deposition on the semiconductor substrate 10 with a polishing process of redundant materials. In other embodiments, the portions of the first planarized layer 30 that are positioned above the surface of the second dichroic film 20 (not shown) may serve as a second buffer layer so that the second buffer layer 22 does not need to be formed before forming the first planarized layer 30.

Figure 4:
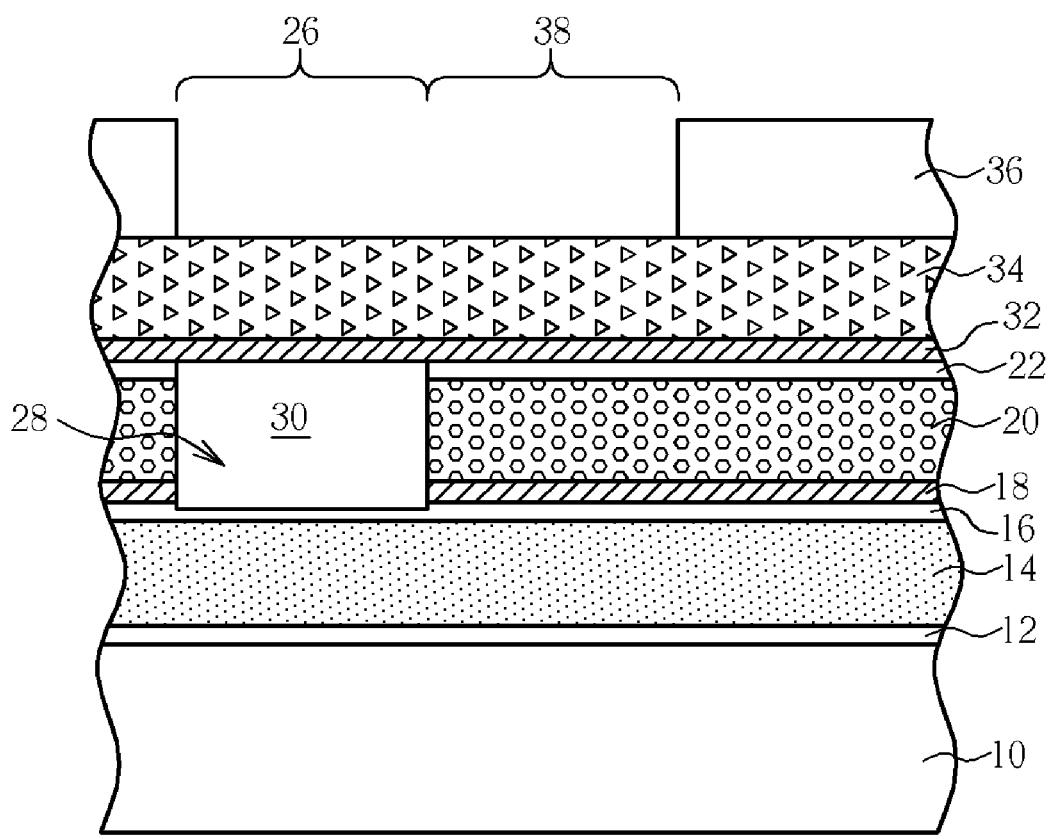

Please refer to FIG. 4. A third reflective layer 32 and a third color filter layer are formed on the surfaces of the first planarized layer 30 and the second buffer layer 22 or the second dichroic film 20, wherein the third color filter layer comprises dichroic material, as the third dichroic film 34 in FIG. 4. Similarly, the third reflective layer 32 may comprise materials the same as those of the first or the second reflective layers 12, 18, such as metal materials or other reflective conductive materials. The third dichroic film 34 preferably comprises inorganic dichroic materials, such as titanium dioxide or silicon dioxide, stacking with various thickness ratios. Then, a second patterned layer 36 is formed on the third dichroic film 34, formed with organic or photoresist materials. The second patterned layer 36 comprises a second exposed region 38 and the first exposed region 26 that may be defined by a lithography process, exposing a portion of the third dichroic film 34. The second exposed region 38 corresponds to at least a second sub-pixel 48 (shown in FIG. 6).

Figure 5:
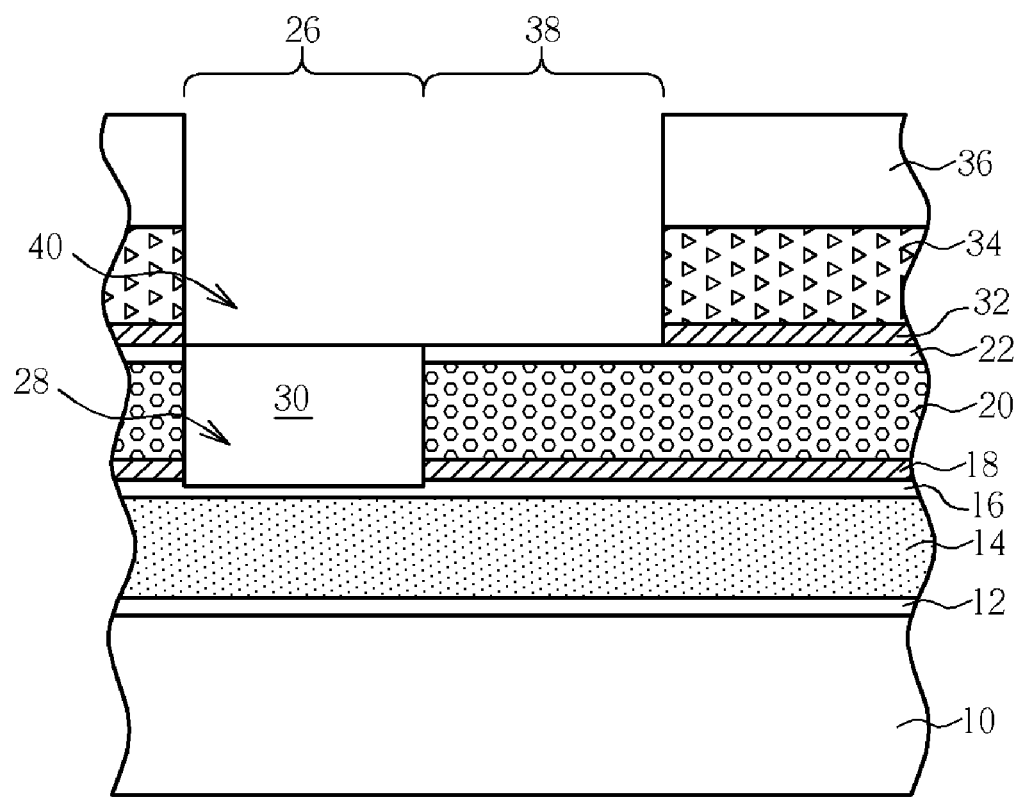
Figure 6:
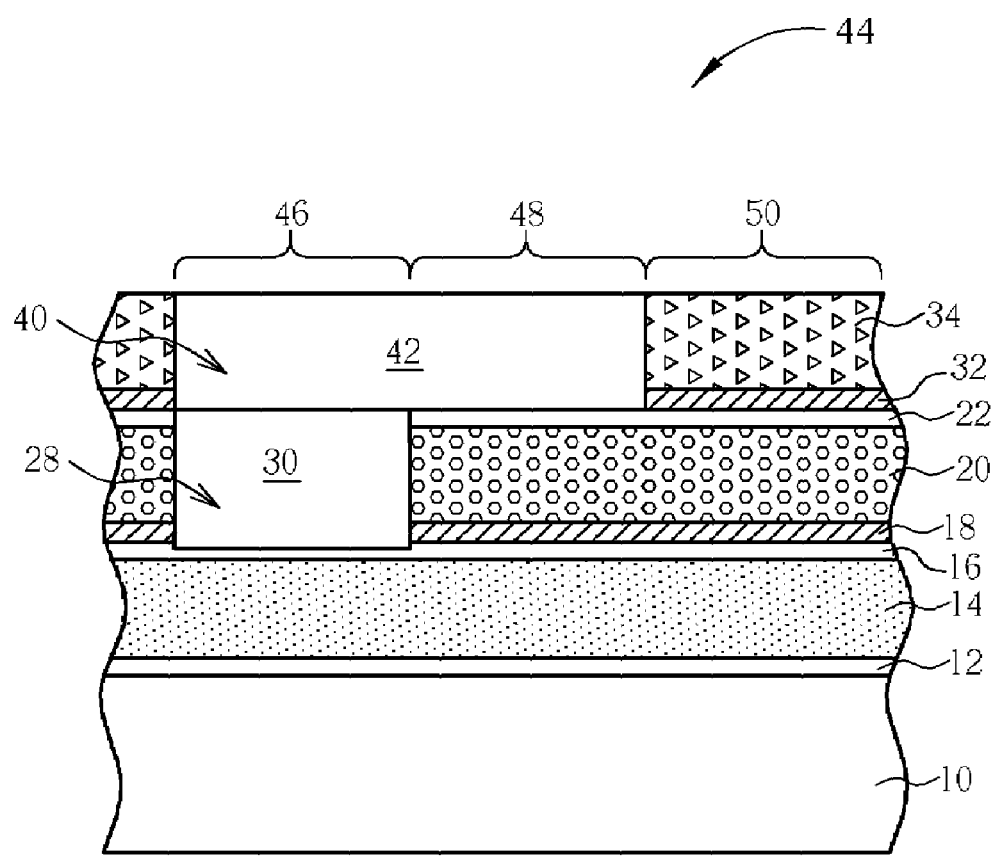

Thereafter, as shown in FIG. 5, the second patterned layer 36 is used as a mask to perform an etching process for removing portions of the third dichroic film 34 and the third reflective layer 32 exposed by the second patterned layer 36, until the second buffer layer 22 is exposed. Alternatively, the etching process may be stopped on the surface of the second dichroic film 20. Accordingly, a second opening 40 is formed in the third dichroic film 34 and the third reflective layer 32. Referring to FIG. 6, the second patterned layer 36 is removed, and a second planarized layer 42 is formed in the second opening 40 on the second dichroic film 20 and the second buffer layer 22. The formation of the second planarized layer 42 may comprise depositing a dielectric material on the semiconductor substrate 10 and in the second opening 40, and polishing the dielectric material to remove redundant parts and planarize the surface of the semiconductor substrate 10. Accordingly, the fabrication of the color filter layers on the present invention color LCoS display is finished and forms a color pixel array 44.

In this embodiment, when light passes through the first, second, and third dichroic films 14, 20, 34, it will be filtered by these dichroic materials to progress out with different ranges of wavelengths, such as green light, red light, and blue light. Accordingly, light progresses into the color pixel array 44 from an upper side will be reflected by the top first, second, or third reflective layers 12, 18, 32 to pass through the top first, second, or third dichroic films 14, 20, 34 and produce green light, red light, and blue light. Therefore, the portions of the semiconductor substrate 10 with the first, second, or third dichroic film 14, 20, 34 are respectively defined as a first sub-pixel 46, a second sub-pixel 48, and a third sub-pixel 50 of the color pixel array 44 (the residual third dichroic film 34 corresponds to the third sub-pixel 50), and the first reflective layer 12 can be used as a pixel electrode electrically connected a MOS transistor or other devices on the semiconductor substrate 10 for producing colorful images.

Figure 7:
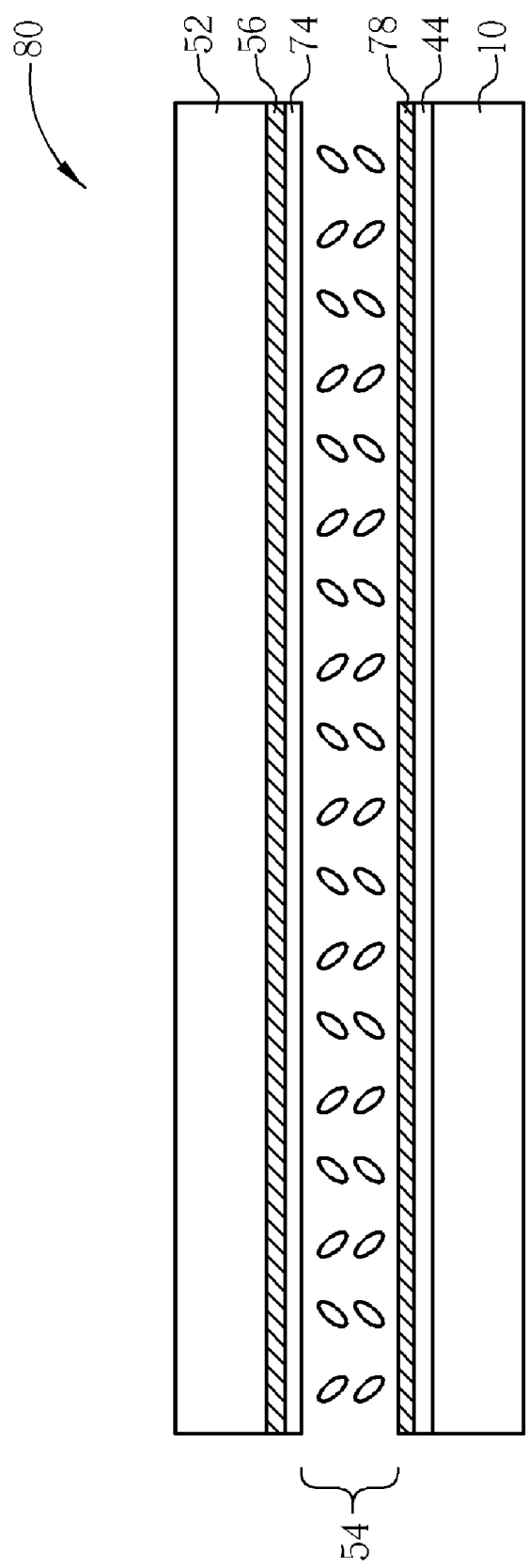

Then, as shown in FIG. 7, a transparent substrate 52 is further provided. The transparent substrate 52 may be a glass or quartz substrate with a transparent conductive layer 56 thereon, such as an indium tin oxide (ITO) layer. The surface of the semiconductor substrate 10 having the color pixel array 44 is faced the transparent substrate 52, and the transparent substrate 52 and the semiconductor substrate 10 is combined and in parallel with each other. For example, sealant may be used to combine the transparent substrate 52 on the semiconductor substrate 10. Then, liquid crystal molecules are filled between the transparent substrate 52 and the semiconductor substrate 10 to form a liquid crystal layer 54 so as to complete the fabrication of the present invention LCoS panel 80. In addition, in order to control the arrangement of the liquid crystal molecules, alignment films 74, 78 may be formed on the inner sides of the transparent substrate 52 and the semiconductor substrate 10 respectively, wherein the alignment film 58 is positioned above the second planarized layer 42 shown in FIG. 6.

It should be noted that the LCoS panel 80 having the color pixel array 44 with at least three colors can be applied to a single-panel LCoS display, thus it is needed to dispose three different kinds of dichroic films (the numerals 14, 20, 34) on the semiconductor substrate 10 fabricated with two etching process to form the first and second openings 28 and 40 so that the first, second, and third dichroic films 14, 20, 34 become the top dichroic films in various sub-pixels of the semiconductor substrate 10 for producing different color lights. However, more dichroic films may be formed on the third dichroic film 34 with repeated or similar processes if the LCoS display panel 80 needs more kinds of color lights in its color pixel array 44.

Furthermore, the fabrication method of a color pixel array according to the present invention may also be applied to an LCoS display with two or more panels. For example, the manufacturers may fabricate a color pixel array with only two kinds of color lights, such as green/red lights or green/blue lights, and provide another LCoS panel with other colors of color filter and an optical engine for producing colorful images. In addition, according to the present invention, if the manufacturer wants to fabricate an LCoS panel with a color pixel array only having two kinds of color lights, only one etching process is needed to make the panel have two different dichroic films on its top surface. Take the first embodiment as an example, the fabrication method of an LCoS display with two-color pixel array only comprises the processes shown in FIGS. 1-3.

Since to fabricate the color pixel array on an LCoS panel is the main objective provided by the present invention, the fabrication processes of pixel electrodes or pixel circuits are not emphasized in the first embodiment of the present invention. However, in order to let readers realize the combination and application of the present invention method for forming a color pixel array and formation processes of electrode circuits, a second embodiment of the present invention method is illustrated in FIG. 8 to FIG. 13, which comprise the simple formation processes of contact plugs, wherein the element numerals are the same as those in FIG. 1 to FIG. 6.

Figure 8:
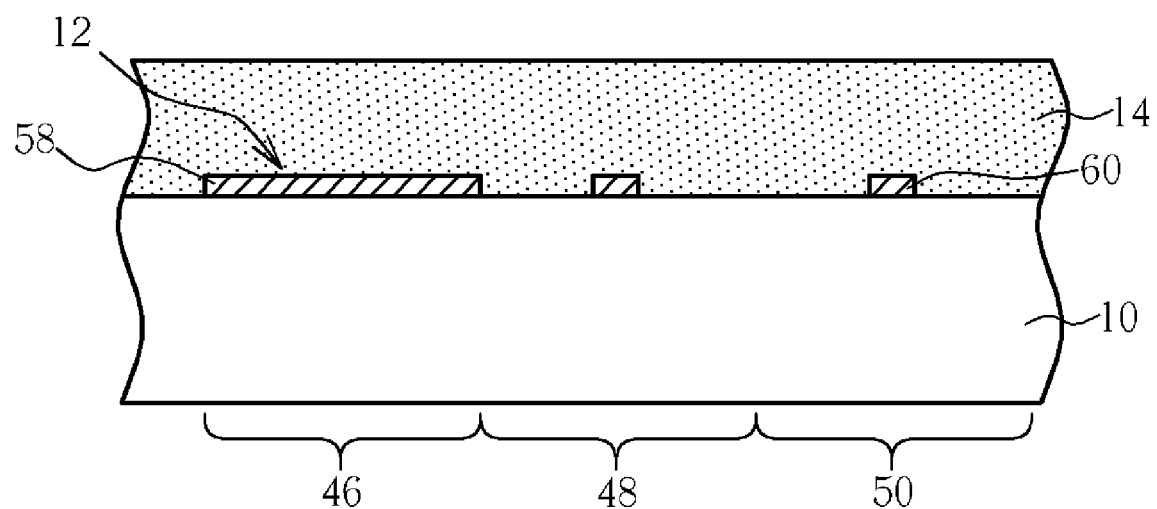
FIG. 8 to FIG. 13 are schematic diagrams of the fabrication method of an LCoS display with a color pixel array according to a second embodiment of the present invention.

Please refer to FIG. 8. First, a semiconductor substrate 10 is provided, with a plurality of sub-pixels defined thereon to form a pixel array, such as the first sub-pixel 46, the second sub-pixel 48, and the third sub-pixel 50. The semiconductor substrate 10 comprises pluralities of pixel circuits (not shown) disposed in each sub-pixel. Then, a first reflective layer 12 is formed on the surface of the semiconductor substrate 10. The first reflective layer 12 comprise a pixel electrode 58 and at least a contact device 60, such as a contact pad, positioned in the second or third sub-pixels 48, 50 (in FIG. 9, each of the second and third sub-pixels 48, 50 has a contact device 60). The pixel electrode 58 corresponds to the first sub-pixel 46 and does not contact the contact devices 60 at all. The formation of the pixel electrode 58 and the contact devices 60 may comprise forming the first reflective layer 12 on the overall semiconductor substrate 10, and performing a photolithography-etching process (PEP) to the first reflective layer 12 for forming the pixel electrode 58 and the contact devices 60. Then, a first dichroic film 14 is formed on the surface of the semiconductor substrate 10, wherein a buffer layer (not shown) may be further formed on the first dichroic film 14.

Figure 9:
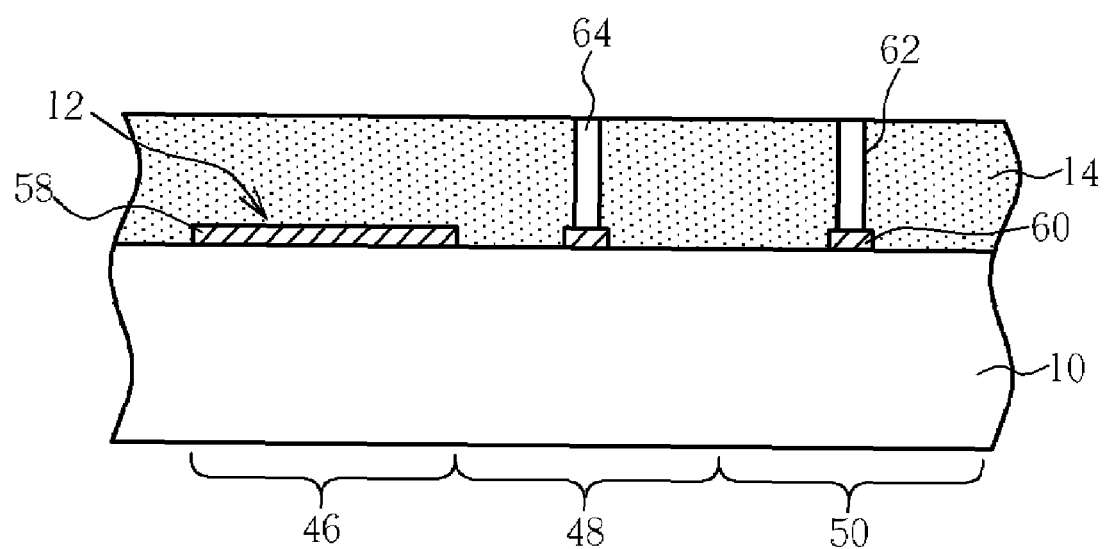
Figure 10:
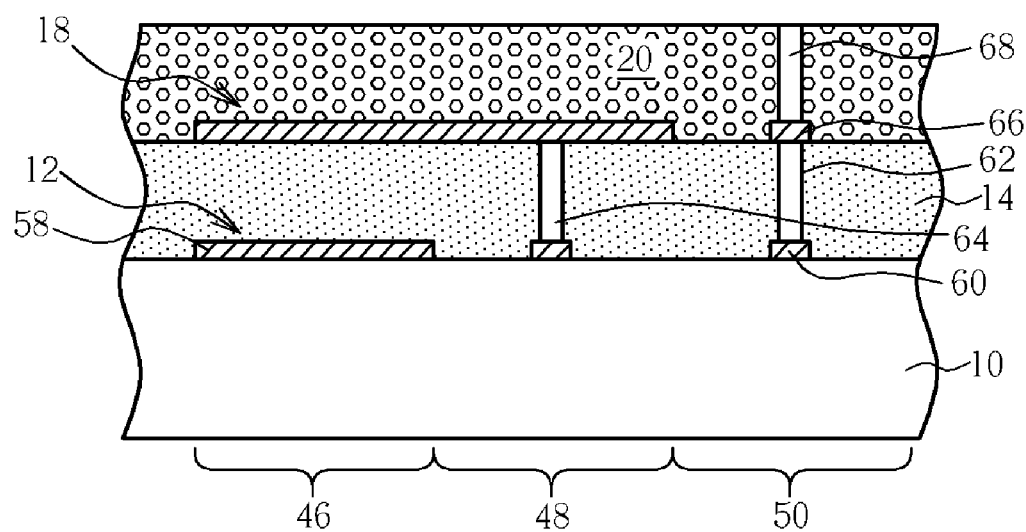

Referring to FIG. 9, a PEP is carried out to form contact holes 62 in portions of the first dichroic film 14 above the contact devices 60. Then, the contact holes 62 are filled with conductive materials to form contact plugs 64 in the first dichroic film 14. As shown in FIG. 10, a second reflective layer 18 is formed on the semiconductor substrate 10, with a pattern corresponding to the first sub-pixel 46 and the second sub-pixel 48. The second reflective layer 18 further comprises a contact device 66 positioned above the contact plug 62 in the third sub-pixel 50. The contact device 66 is electrically connected to the contact device 60 through the contact plug 64. Thereafter, a second dichroic film 20 is formed on the overall semiconductor substrate 10, and a contact plug 68 is formed therein, electrically connected to the contact device 66 and the contact device 60.

Figure 11:
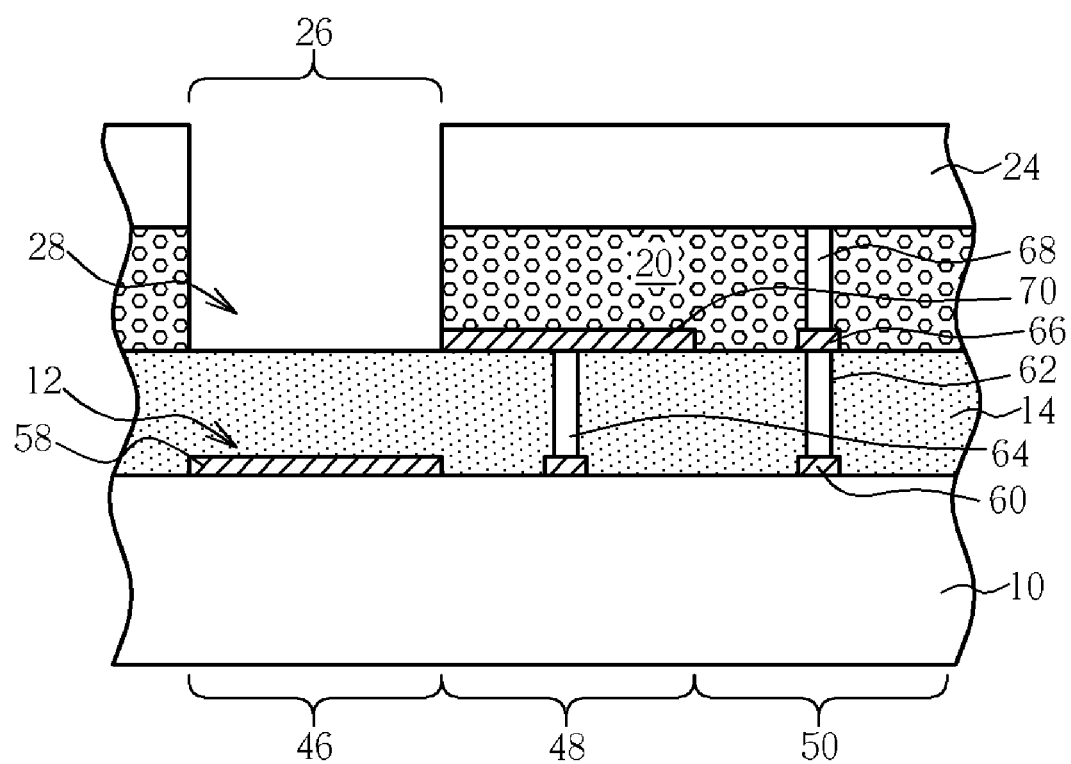

Referring to FIG. 11, a first photoresist layer as the first patterned layer 24 is coated on the semiconductor substrate 10. The first patterned layer 24 comprises the first exposed region 26 that corresponds to the first sub-pixel 46. Then, an etching process is carried out to remove portions of the second dichroic film 20 and the second reflective layer 18 through the first exposed region 26 until the surface of the first dichroic film 14 is exposed. Accordingly, a first opening 28 is formed in the second dichroic film 20 in the first sub-pixel 46. The residual second reflective layer 18 positioned in the second sub-pixel 48 is considered as a pixel electrode 70 of the second sub-pixel 48, which is electrically connected to the contact device 60 of the second sub-pixel 48 through the contact plug 64.

Figure 12:
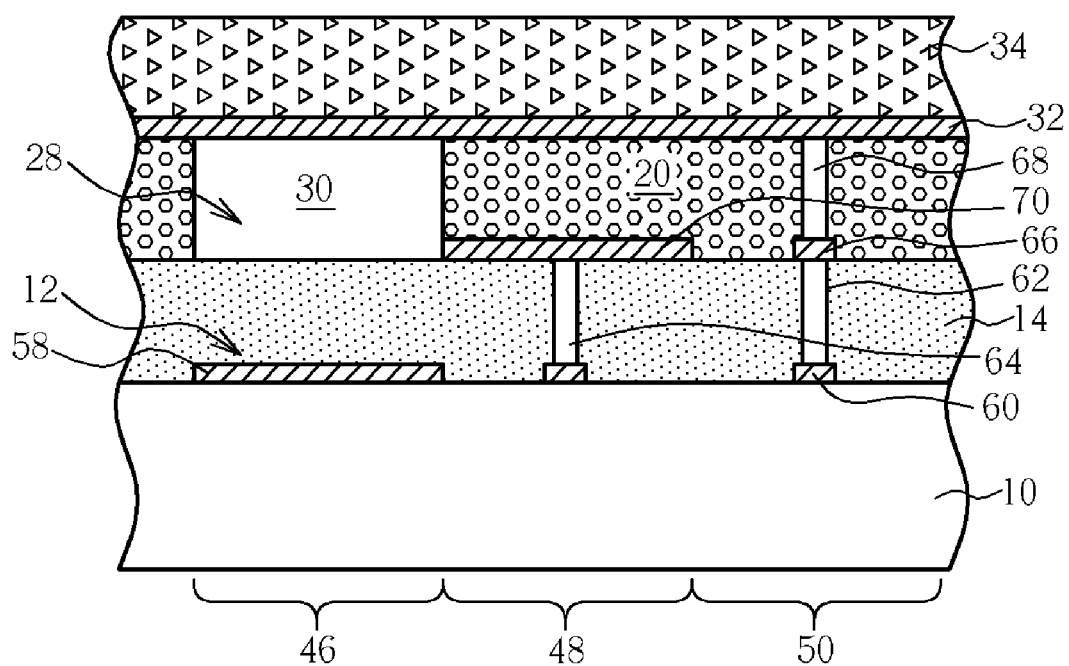
Figure 13:
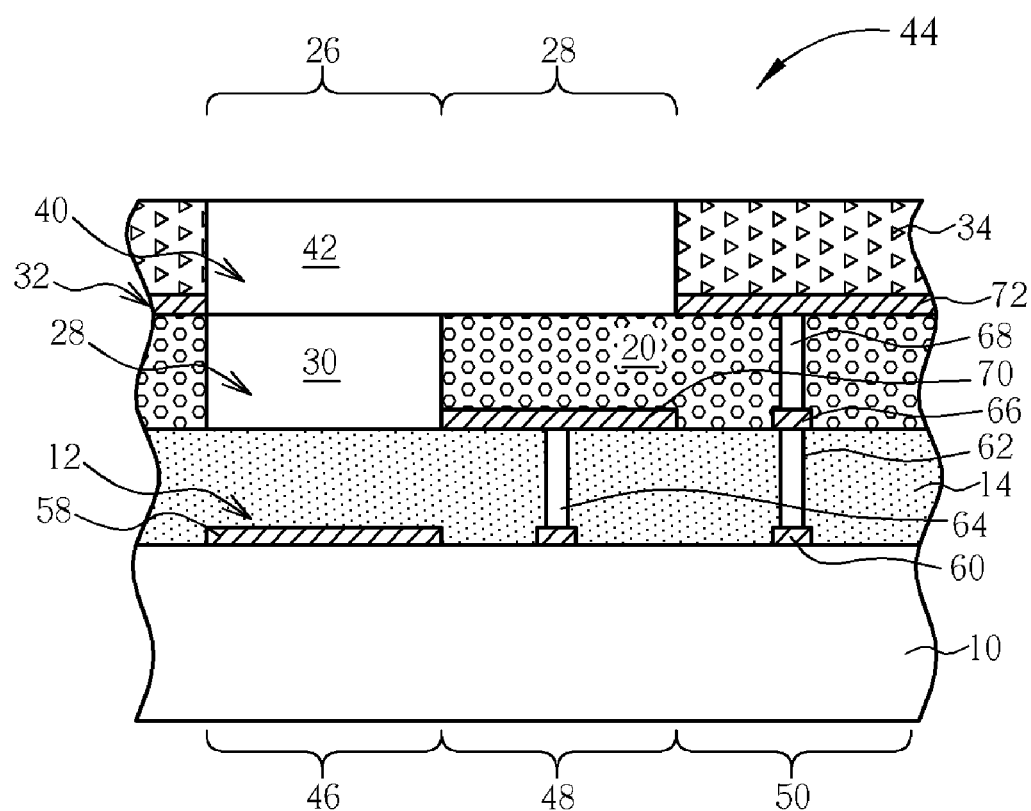

Sequentially, as shown in FIG. 12, the first patterned layer 24 is removed, and a first planarized layer 30 is formed on the semiconductor substrate 10 and in the first opening 28. A third reflective layer 32 and a third dichroic film 34 are successively formed on the surface of the semiconductor substrate 10. Referring to FIG. 13, a second patterned layer (not shown) is formed on the third dichroic film 34, comprising the first and second exposed regions 26, 38 and exposing the third dichroic film 34 positioned in the first and second sub-pixels 46, 48. The second patterned layer is taken as an etching mask to perform an etching process for removing the portions of the third dichroic film 34 and the third reflective layer 32, until the surface of the second dichroic film 20 is exposed. Therefore, a second opening 40 is formed in the third dichroic film 34, corresponding to the first and second sub-pixels 46, 48. Finally, a second planarized layer 42 is formed in the second opening 40 so as to finish the fabrication of the color pixel array 44. Note that the residual third reflective layer 32 corresponding to the third sub-pixel 50 is electrically connected to the contact device 60 through the contact plug 68 and serves as a pixel electrode 72.

Figure 14:
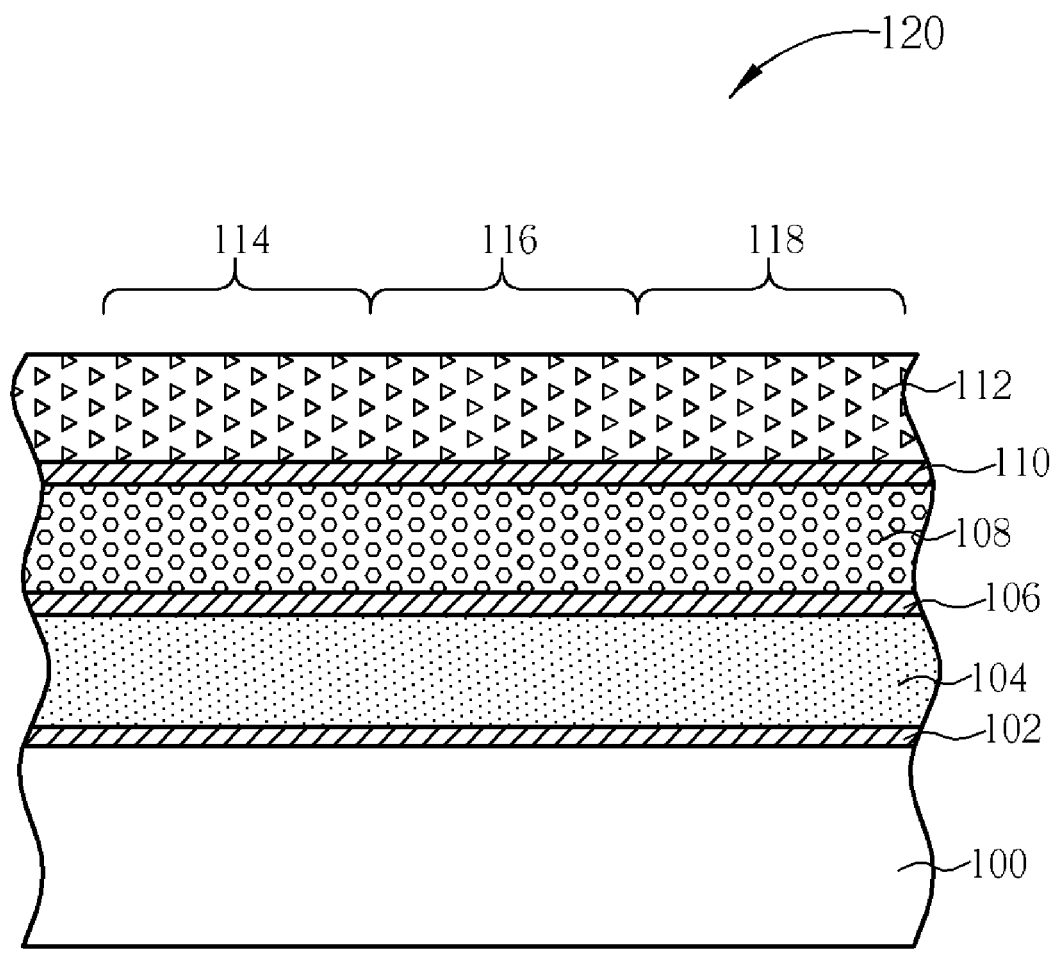
FIGS. 14-18 are schematic diagrams of the fabrication method of an LCoS display with a color pixel array according to a third embodiment of the present invention.

In other embodiments of the present invention, the first, second, and third dichroic films and the first, second, and third reflective layers may be formed on the semiconductor substrate before performing etching processes to define the dichroic films or color filters. FIG. 14 to FIG. 19 are schematic diagrams of the fabrication method of an LCoS display with a color pixel array according to a third embodiment of the present invention. First, as shown in FIG. 14, a semiconductor substrate 100 is provided. The semiconductor substrate 100 comprises a plurality of pixel circuits or electric devices (not shown) and a plurality of sub-pixels, such as the first sub-pixel 114, second sub-pixel 116, and third sub-pixel 118, for providing different kinds of color lights to form a color pixel array 120. Then, a first reflective layer 102, a first color filter layer 104, a second reflective layer 106, a second color filter layer 108, a third reflective layer 110, and a third color filter layer 112 are successively formed on the semiconductor substrate 100, wherein the first, second, and third color filter layers 104, 108, 112 may comprise inorganic dichroic materials. A first and a second buffer layers (not shown) may be selectively formed on the first and second color filter layers 104, 108 respectively, composed of materials the same as the materials of the first and second color filter layers 104, 108 or other materials provided that the optical effect of the lower dichroic materials is not influenced. Those buffer layers could provide a buffer functionality in the follow etching processes to the second and third reflective layers 106, 110 for protecting the dichroic materials.

Figure 15:
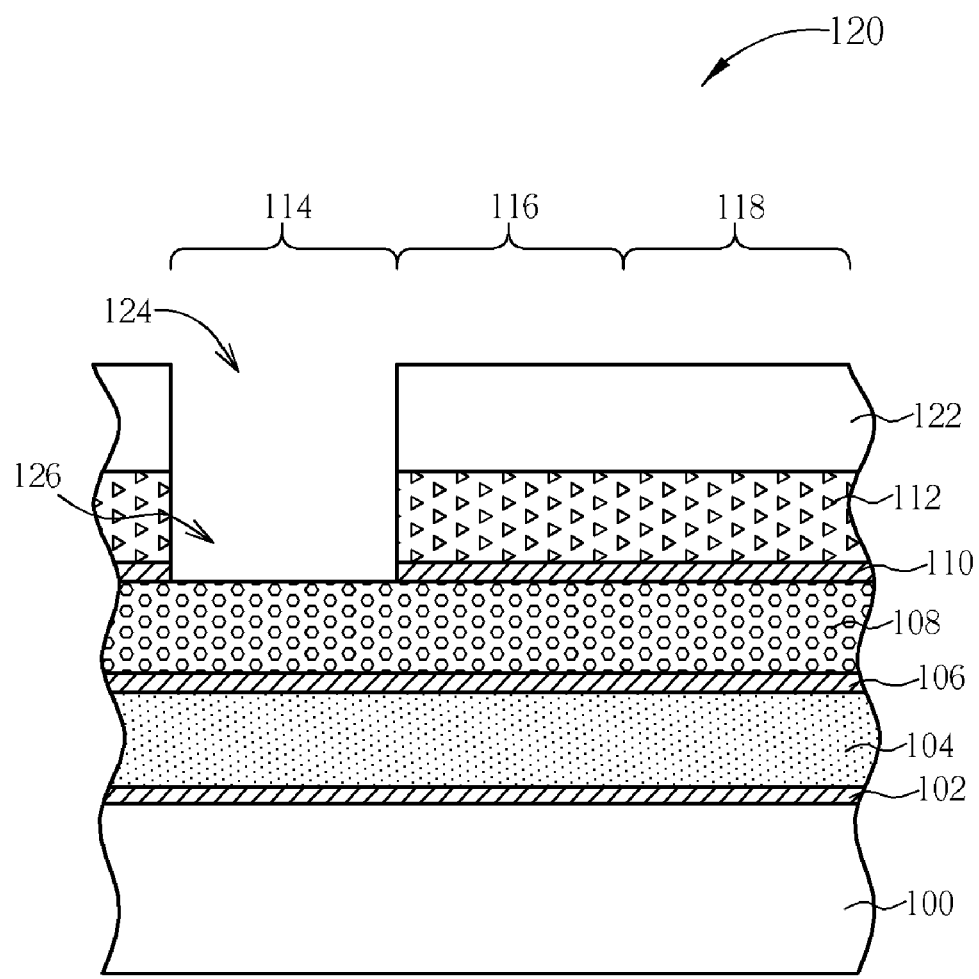

Then, as shown in FIG. 15, a first patterned layer 122 is formed on the third color filter layer 112, which comprises a first exposed region 124 exposing a portion of the third color filter layer 112 corresponding to the first sub-pixel 114. The first patterned layer 122 is taken as an etching mask to perform a first etching process so as to remove the portions of the third color filter layer 112 and the lower third reflective layer 110 exposed by the first patterned layer 122 until the surface of the second color filter layer 108 is exposed, while an opening 126 is formed in the third color filter layer 112 corresponding to the first exposed region 124.

Figure 16:
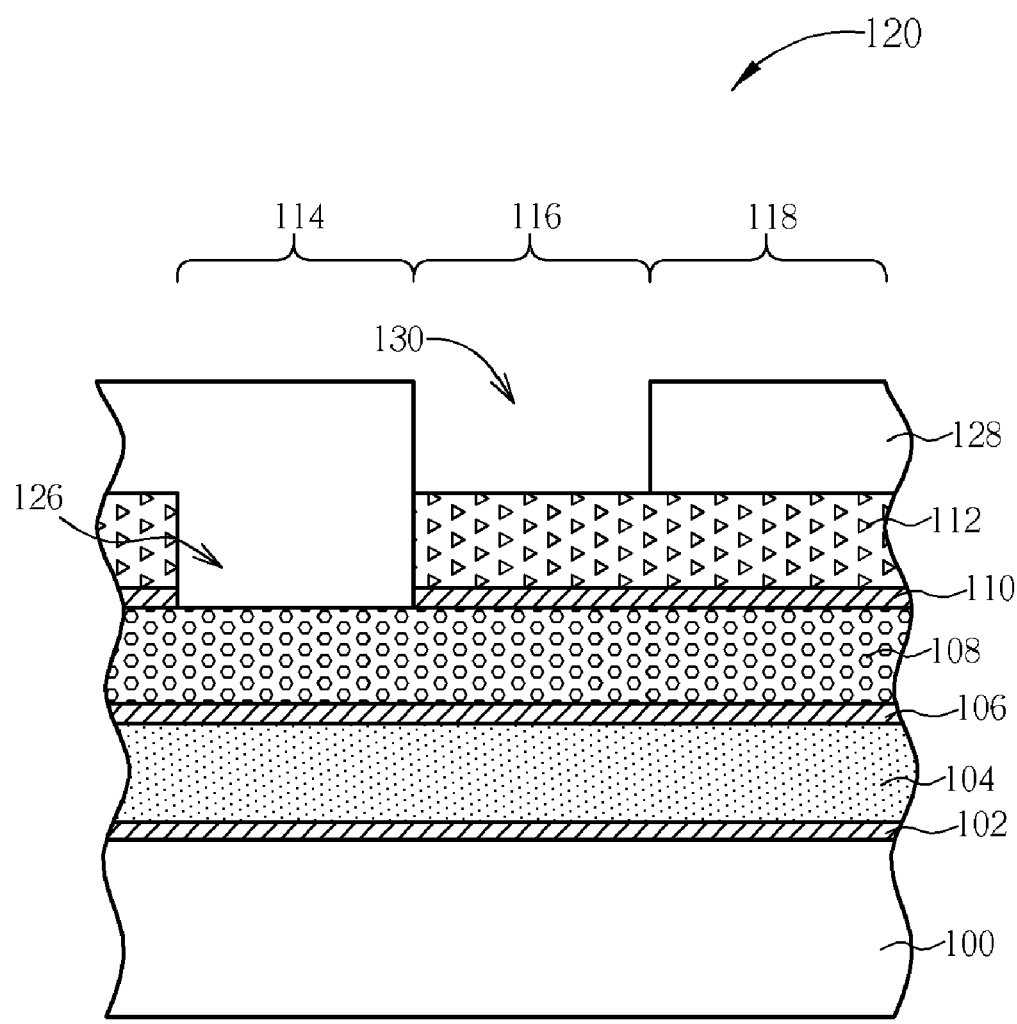
Figure 17:
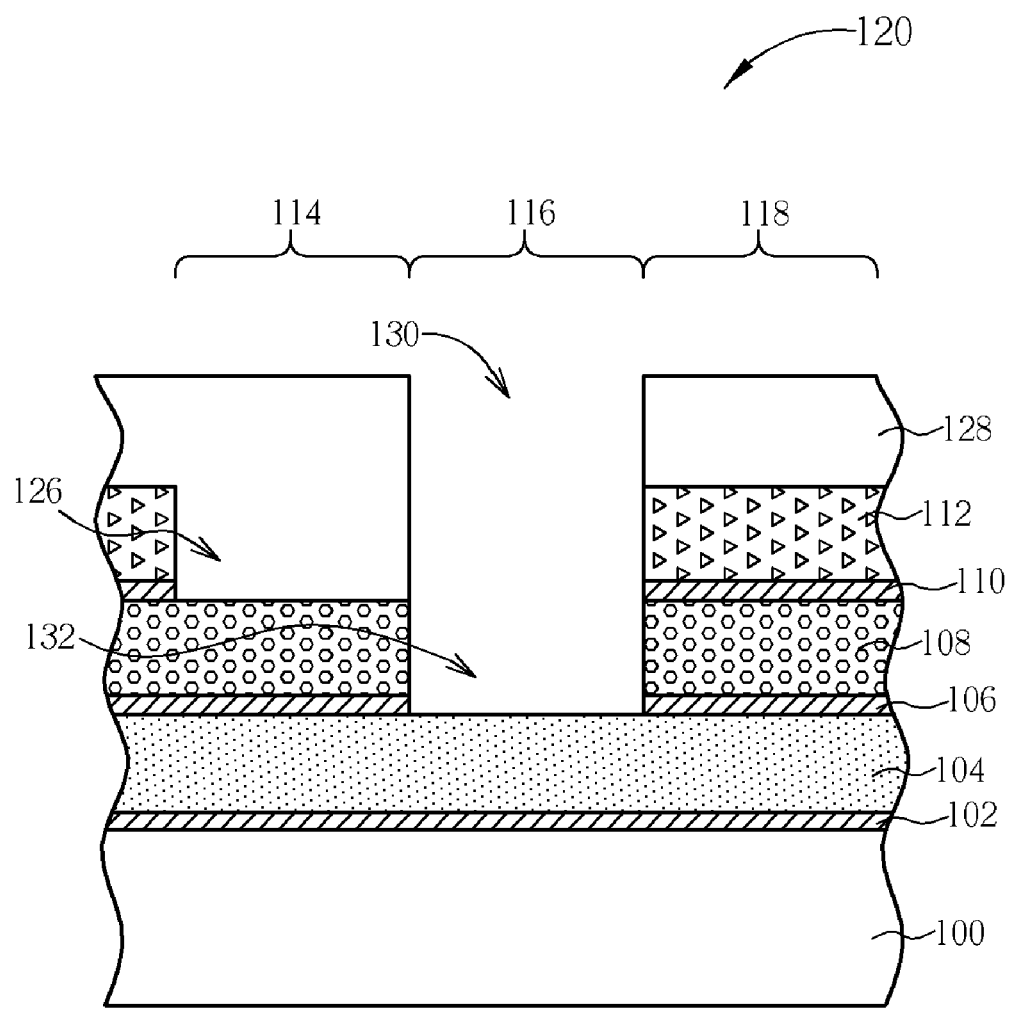

Thereafter, referring to FIG. 16, a planarized layer (not shown) may be selectively filled in the opening 126 to make the semiconductor substrate 100 have a flat top surface approximately parallel to the surface of the third color filter layer 112. Alternatively, a second patterned layer 128 may be directly formed on the semiconductor substrate 100, which comprises a second exposed region 130, exposing a portion of the third color filter layer 112 corresponding to the second sub-pixel 116. As shown in FIG. 17, the second patterned layer 128 is taken as an etching mask to perform a second etching process for removing the exposed third color filter layer 112, the third reflective layer 110, the second color filter layer 108, and the second reflective layer 106 until the surface of the first color filter layer 104 is exposed. Accordingly, an opening 132 is formed in the third and second color filter layers 112, 108 and the third and second reflective layers 110, 106.

Figure 18:
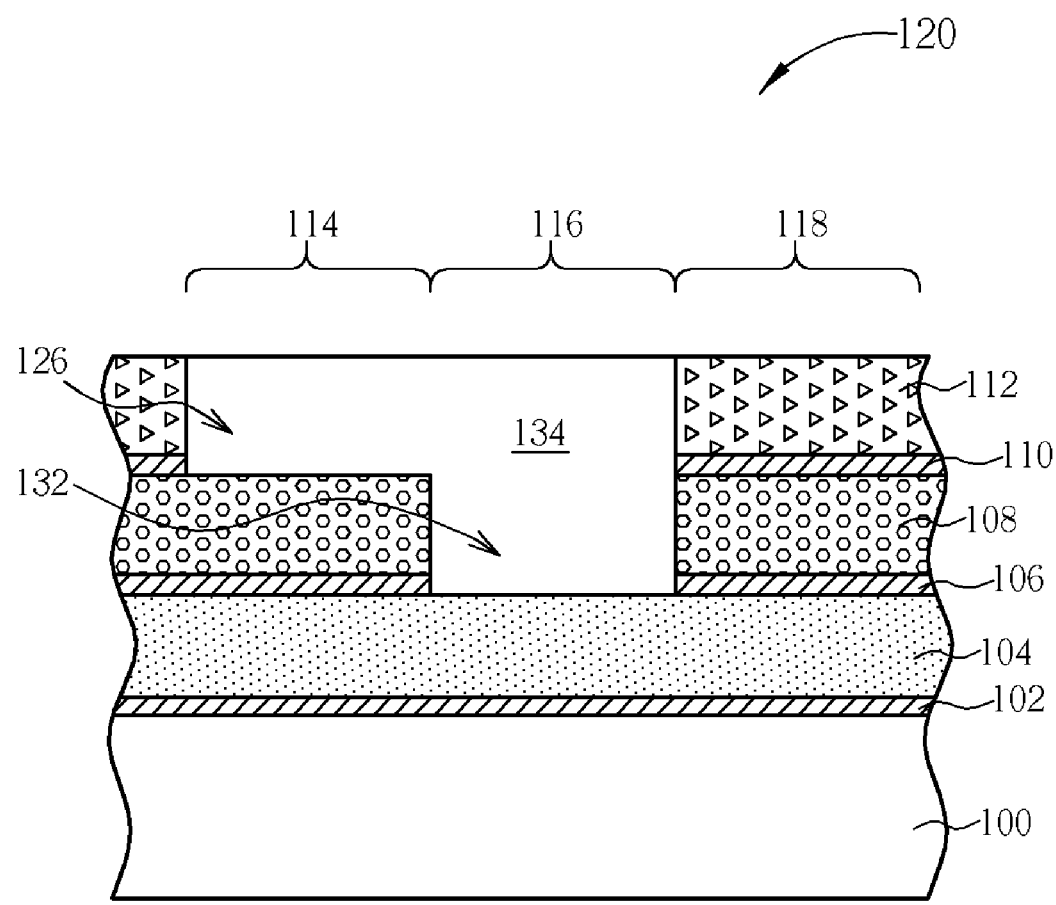

Please refer to FIG. 18. The second patterned layer 128 is removed. Sequentially, a planarized layer 134 is formed in the opening 132 and the opening 126, whose formation steps may comprise blanket depositing planarized layer materials (not shown) on the semiconductor substrate 100, and polishing the planarized layer materials to removing the planarized layer materials positioned higher than the surface of the third color filter layer 112 so that the surface of the planarized layer materials is approximately the same as the surface of the third color filter layer 112. The materials of the planarized layer 134 may comprise materials composing the first, second, or third color filter layers 104, 108, 112 and inorganic materials, such as silicon dioxide or titanium dioxide, or other materials that do not affect the optical functions of the first, second, or third color filter layers 104, 108, 112.

Accordingly, light from the top side of the color pixel array 120 can be reflected by the top second, first, or third reflective layers 106, 102, 110 in the different first, second, and third sub-pixels 114, 116, 118 and pass through the second, the first, or the third color filter layers 108, 104, 112 on the top surface of the semiconductor substrate 100 to generate various color lights, such as green light, blue light, and red light.

In other embodiments, the above-mentioned second etching process may be stopped at the third reflective layer 110, so that the second color filter layer 108 becomes the top layer in the first and the second sub-pixels 114, 116. In this situation, light reflected from the color pixel array 120 only has two kinds of color lights affected by the second color filter layer 108 and the third color filter layer 112. As a result, those skilled in the art could design a single color pixel array or a single LCoS panel that comprises pixels composed of various kinds or amounts of color lights in different areas according to the method and spirit of the present invention. For example, according to the above-mentioned method processes, multiple color filter layers and reflective layers (or etching-stop layers) may be formed on a same semiconductor substrate with various depths or structures of openings in different pixels, and therefore different pixels can produce one to three kinds or even more kinds of color lights on the same semiconductor substrate.

In addition, although the method of forming the pixel electrodes and contact plugs between the first, second, and third color filter layers 104, 108, 112 are not taught in the second embodiment, those skilled in the art may combine the processes of the previous embodiments to form contact plugs, contact pads, or other electrical devices together with the present invention color pixel array 120. Furthermore, those skilled in the art may also combine the processes of the previous embodiments to provide a transparent substrate and liquid crystal molecules for combining with the semiconductor substrate 100 in order to form an LCoS display.

Figure 19:
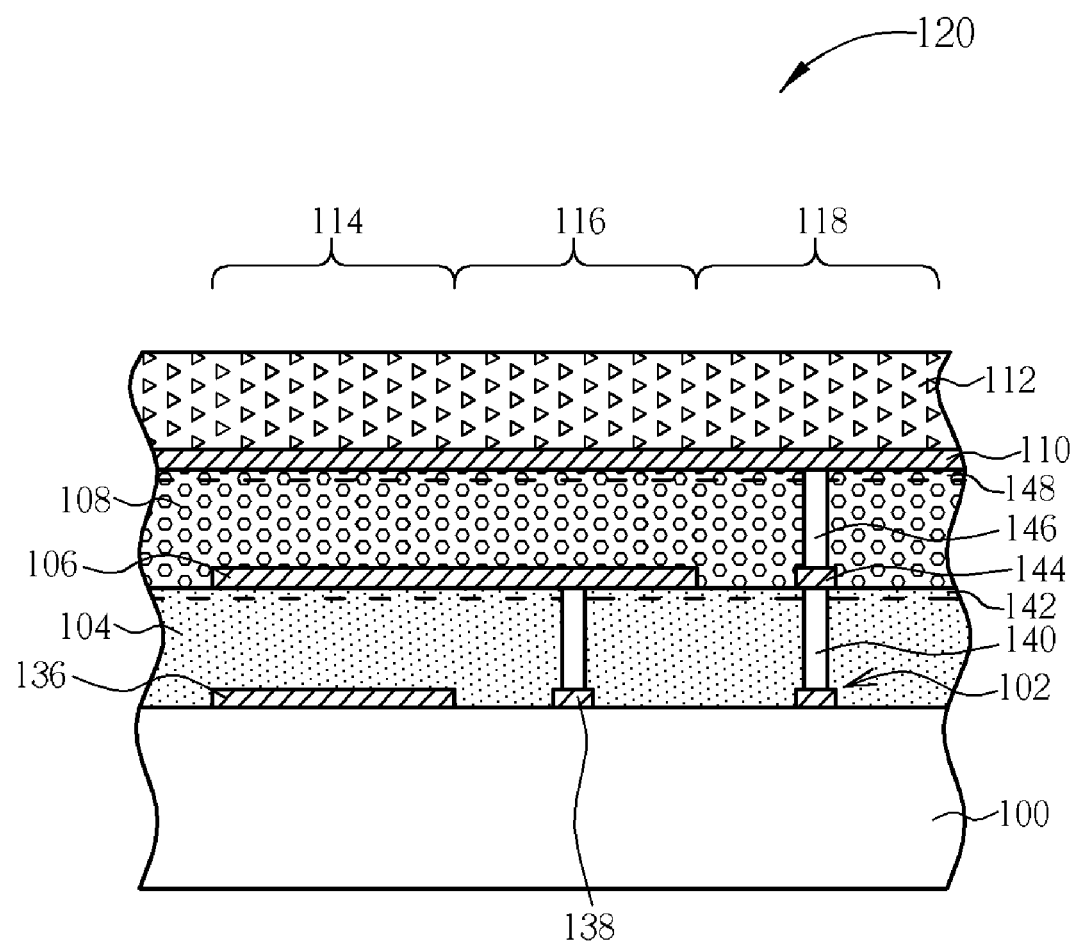
FIGS. 19-22 are schematic diagrams of the fabrication method of a color pixel array of an LCoS display according to a fourth embodiment of the present invention.

FIGS. 19-22 are schematic diagrams of the fabrication method of a color pixel array of an LCoS display according to a fourth embodiment of the present invention. The elements in these figures have the same numerals in FIGS. 14 to 18. First, as shown in FIG. 19, a semiconductor substrate 100 is provided, which has a plurality of sub-pixels thereon. This embodiment only shows a pixel that comprises a first sub-pixel 114, a second sub-pixel 116, and a third sub-pixel 118 for explanation. Sequentially, a first reflective layer 102 is formed on the semiconductor substrate 100. The first reflective layer 102 comprises a pixel electrode 136 positioned in the first sub-pixel 114 and two contact devices 138 positioned in the second sub-pixel 116 and the third sub-pixel 118 respectively, wherein the pixel electrode 136 and the contact devices 138 do not contact with each other and are electrically connected to the pixel circuits or electric devices (not shown) in the first, second, and third sub-pixels 114, 116, 118 respectively. The formation of the first reflective layer 102 may comprise depositing metal materials or other conductive materials on the semiconductor substrate 100 to from a reflective layer, and performing a PEP to define the pixel electrode 136 and the contact devices 138.

Thereafter, a first color filter layer 104 and a first buffer layer 142 are formed on the surface of the semiconductor substrate 100. The first buffer layer 142 may comprise materials the same as the first color filter layer 104, which is formed with an extra thickness of materials of the first color filter layer 104. Then, portions of the first color filter layer 104 and the first buffer layer 142 are removed to from contact holes in the first color filter layer 104 above the contact devices 138 before filling conductive materials into the contact holes for forming contact plugs 140. Sequentially, a second reflective layer 106, a second color filter layer 108, and a second buffer layer 148 are successively formed on the semiconductor substrate 100. Similarly, the materials of the second buffer layer 148 may be like the materials of the second color filter layer 108. The portion of the second reflective layer 106 corresponding to the third sub-pixel 118 comprises a contact device 144, and the second reflective layer 106 further covers a portion of the first color filter layer 104 corresponding to the first and second sub-pixels 114, 116. Then, a contact plug 146 is formed in the second color filter layer 108 and the second buffer layer 148 above the contact device 144. The contact plug 146 is electrically connected to the contact device 138 in the third sub-pixel 118 through the contact device 144 and the contact plug 140. Thereafter, a third reflective layer 110 and a third color filter layer 112 are formed on the second buffer layer 148 or the second color filter layer 108.

Figure 20:
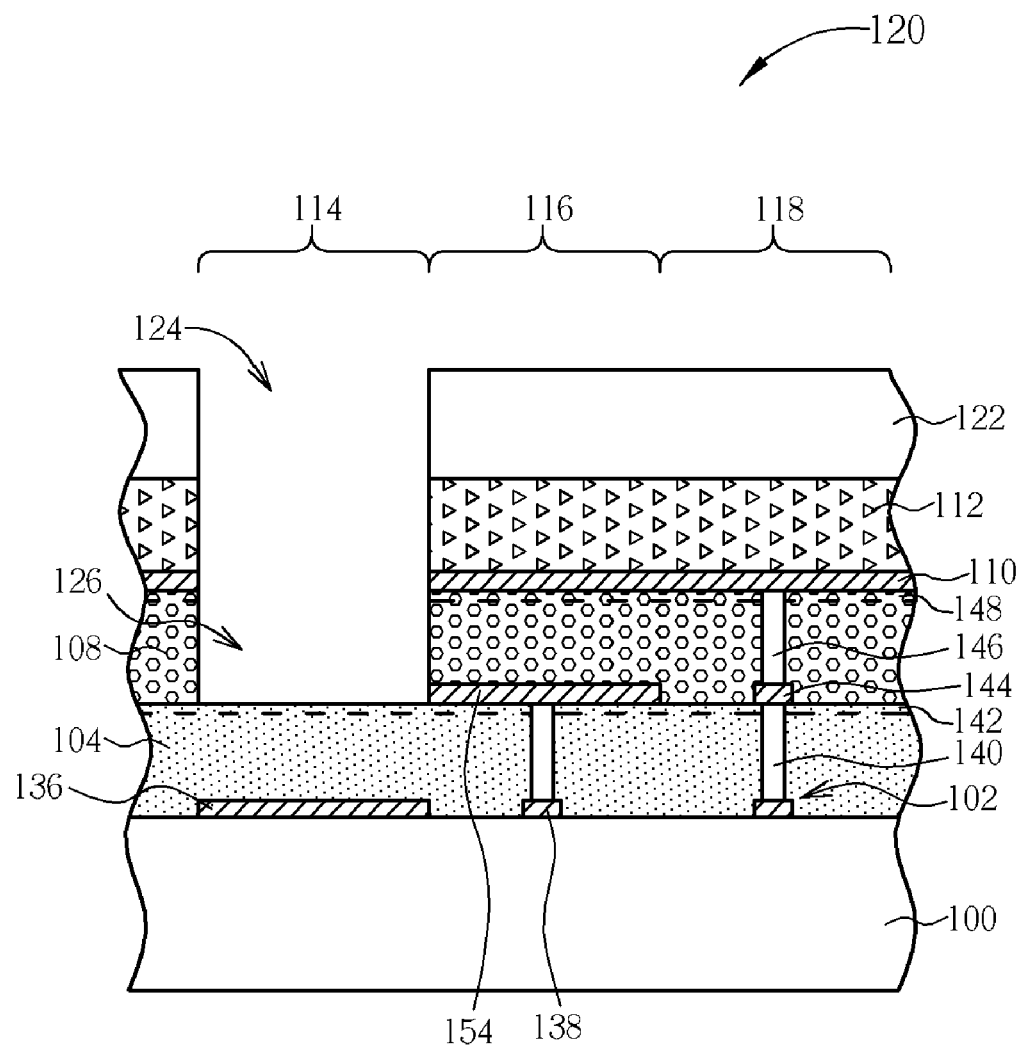

Referring to FIG. 20, a first patterned layer 122 is formed on the third color filter layer 112, which comprises a first exposed region 124 exposing a portion of the third color filter layer 112 corresponding to the first sub-pixel 114. Then, the first patterned layer 122 is taken as an etching mask to remove a portion of the third color filter layer 112 and the lower third reflective layer 110, second buffer layer 148, second color filter layer 108, and second reflective layer 106, until the surface of the first buffer layer 142 is exposed, forming an opening 126. Accordingly, the residual second reflective layer 106 that corresponds to the second sub-pixel 116 serves as a pixel electrode 154 of the second sub-pixel 116.

Figure 21:
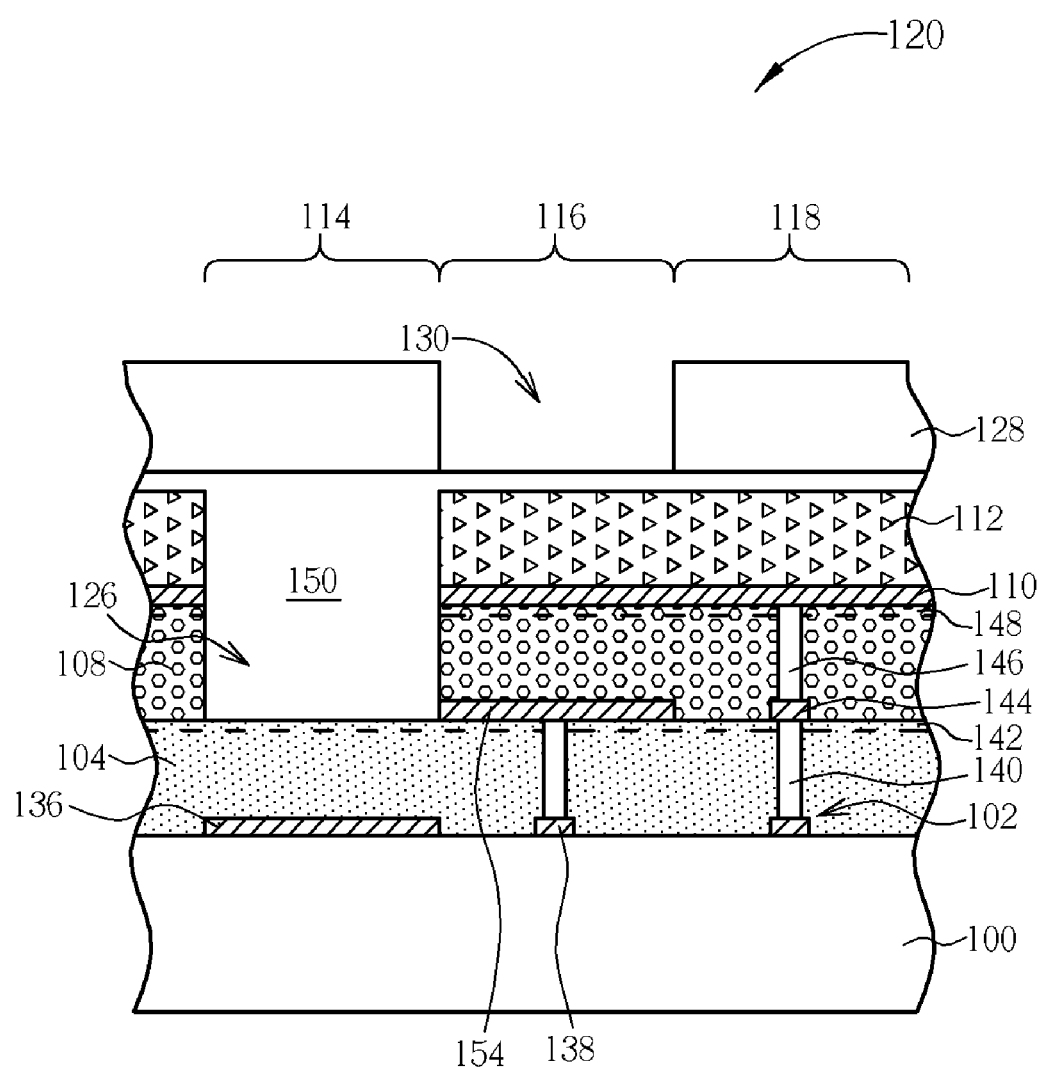

As shown in FIG. 21, a first planarized layer 150 is formed in the opening 126, whose materials may be the same as those of the first buffer layer 142. The fabrication of the first planarized layer 150 comprises depositing planarized layer materials on the semiconductor substrate 100, and selectively performing a polishing process to remove redundant planarized layer materials of the first planarized layer 150. Then, a second patterned layer 128 is formed on the first planarized layer 150 and the third color filter layer 112, comprising a second exposed region 130 that corresponds to the second sub-pixel 116.

Figure 22:
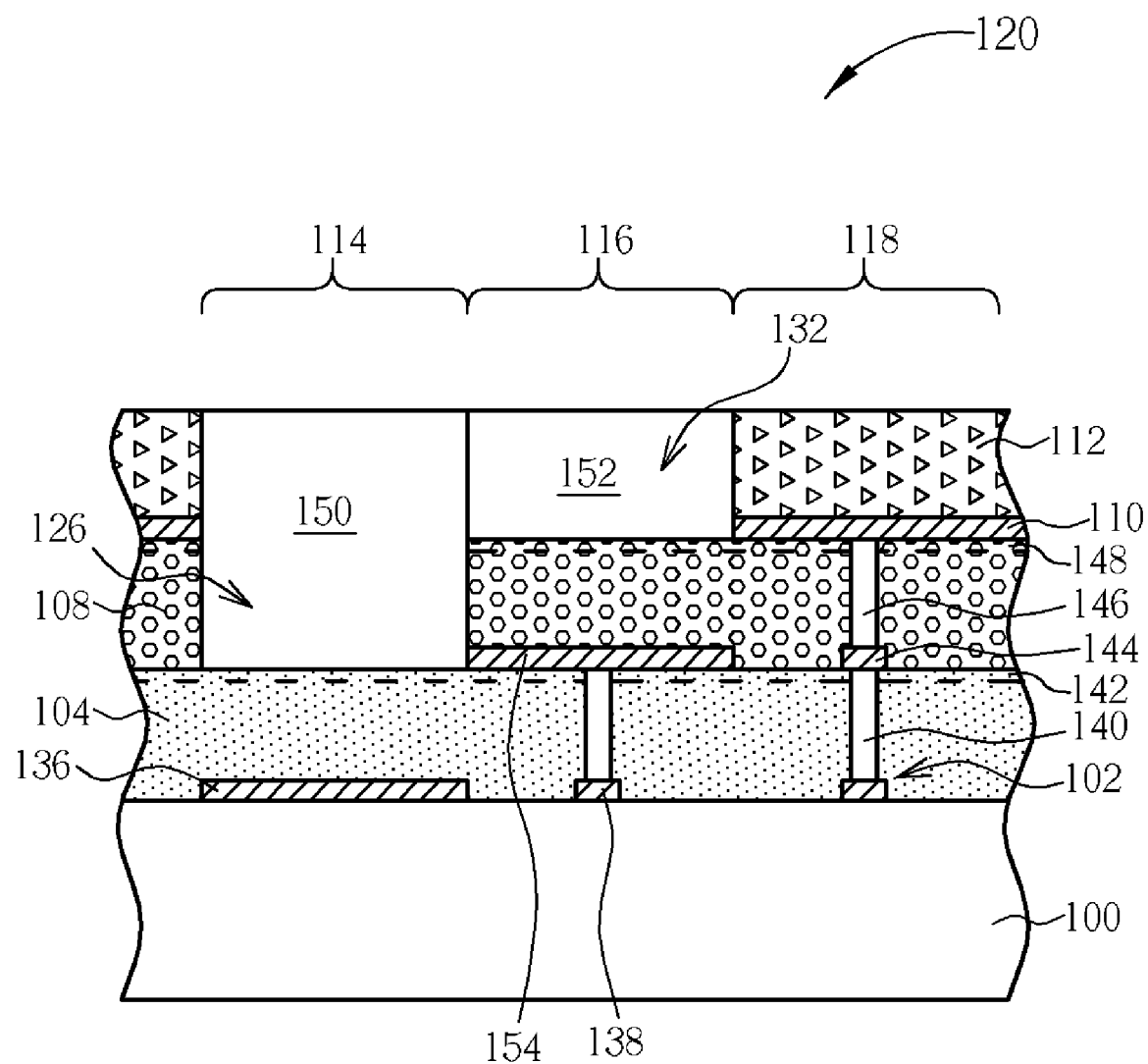

Referring to FIG. 22, the second patterned layer 128 is taken as a mask to remove the exposed first planarized layer 150, third color filter layer 112, and third reflective layer 110, until the surface of the second buffer layer 148 is exposed. Accordingly, an opening 132 is formed in the third color filter layer 112 and the third reflective layer 110, which corresponds to the second sub-pixel 116. Then, the second patterned layer 128 is removed, and a second planarized layer 152 is formed on the semiconductor substrate 100 and in the opening 132. The second planarized layer 152 may comprise materials the same as those of the second buffer layer 148 or the second color filter layer 108. Sequentially, a polishing process is carried out to remove the first and second planarized layers 150, 152 above the surface of the third color filter 112 to complete the fabrication of the present invention color pixel array 120.

In contrast to the prior art, three reflective layers and the first, second, and third color filter layers are disposed alternately according to the present invention. Since the reflective layers comprise metal materials and the color filter layers have different etching property with a high etching selecting ratio, the reflective layers can be used as etching stop layers for defining the patterns of the first, second, and third color filter layers in each sub-pixel to prevent from damaging the color filter layers below the reflective layers in etching processes. As a result, the present invention can utilize simple etching processes to form the color pixel array for producing various color lights in sub-pixels provided by the first, second, third color filter layers thereon in a single LCoS panel, so as to generate colorful images. Furthermore, the present invention LCoS display provides a color pixel array in a single LCoS panel, thus the complex optical engine in the prior-art can be simplified. For example, the color separate and combination optical systems or color wheels can be omitted. Only a white light source is needed to provide colorful images in the present invention LCoS display with a color pixel array. Accordingly, the fabrication cost and product size can be effectively reduced.

Those skilled in the art will readily observe that numerous modifications and alterations of the device and method may be made while retaining the teachings of the invention.

What is claimed is:

1. A fabrication method of a liquid crystal on silicon (LCoS) display with a color pixel array, comprising:
   providing a semiconductor substrate;
   successively forming a first reflective layer, a first color filter layer, a second reflective layer, and a second color filter layer on the semiconductor substrate;

forming a first patterned layer with a first exposed region on the second color filter layer;

removing portions of the second color filter layer and the second reflective layer exposed by the first patterned layer so as to form a first opening in the second color filter layer;

removing the first patterned layer; and forming a first planarized layer in the first opening for planarizing the surface of the semiconductor substrate.

2. The fabrication method of claim 1, wherein the step of removing the portions of the second color filter layer and the second reflective layer comprises:

removing the portion of the second color filter layer exposed by the first patterned layer until exposing the second reflective layer; and removing the portion of the second reflective layer exposed by the second color filter layer until exposing the first color filter layer.

3. The fabrication method of claim 1, further comprising forming a first buffer layer on the first color filter layer before forming the second reflective layer.

4. The fabrication method of claim 3, wherein the first buffer layer comprises materials the same with materials of the first color filter layer.

5. The fabrication method of claim 3, wherein the first buffer layer comprises materials different from materials of the first color filter layer.

6. The fabrication method of claim 5, wherein the first buffer layer comprises epoxy.

7. The fabrication method of claim 1, further comprising:

successively forming a third reflective layer and a third color filter layer on surfaces of the first planarized layer and the second color filter layer;

forming a second patterned layer on the third color filter layer, the second patterned layer comprising a second exposed region and the first exposed region;

removing portions of the third color filter layer and the third reflective layer exposed by the second patterned layer so as to form a second opening; and forming a second planarized layer in the second opening for planarizing the surface of the semiconductor substrate.

8. The fabrication method of claim 7, wherein the first and second exposed regions correspond to at least a first and a second sub-pixels defined on the semiconductor substrate respectively, and the remaining third color filter layer corresponds to at least a third sub-pixel defined on the semiconductor substrate.

9. The fabrication method of claim 7, wherein the third reflective layer comprises a metal material.

10. The fabrication method of claim 7, further comprising forming a second buffer layer on a surface of the second color filter layer before forming the third reflective layer.

11. The fabrication method of claim 1, wherein the first reflective layer comprises:

a pixel electrode corresponding to the first exposed region; and at least a contact device disposed on a portion of the semiconductor substrate other than the portion of the first exposed region on the semiconductor substrate.

12. The fabrication method of claim 11, further comprising forming a contact plug in the first color filter layer, the contact plug corresponding to the contact device and electrically connecting the contact device and the second reflective layer.

13. The fabrication method of claim 12, wherein the step of forming the contact plug comprises:

removing a portion of the first color filter layer to form a contact hole in the first color filter layer above the contact device; and filling a conductive material into the contact hole to form the contact plug.

14. The fabrication method of claim 1, wherein the first reflective layer and the second reflective layer comprise metal materials respectively.

15. The fabrication method of claim 1, wherein the first planarized layer comprises a material the same as a material of the first color filter layer.

16. The fabrication method of claim 1, wherein the first color filter layer and the second color filter layer are capable of filtering natural light to provide a first color light and a second color light with different ranges of wavelengths respectively.

17. The fabrication method of claim 16, wherein the first color light and the second color light are respectively blue light and green light, blue light and red light, or green light and red light.

18. The fabrication method of claim 1, further comprising forming an alignment film on the semiconductor substrate.

19. The fabrication method of claim 18, further comprising:

providing a transparent substrate with a transparent conductive layer thereon;

combining the transparent substrate and the semiconductor substrate; and disposing liquid crystal materials between the transparent substrate and the semiconductor substrate.

20. The fabrication method of claim 1, wherein the first color filter layer and the second color filter layer comprise inorganic dichroic materials respectively.

21. The fabrication method of claim 1, wherein the first and the second patterned layers comprise photoresist materials respectively.

* * * * *